(12) United States Patent
Agiwal et al.

(10) Patent No.: US 12,192,880 B2
(45) Date of Patent: Jan. 7, 2025

(54) METHOD OF HANDLING COMMON CHANNEL MONITORING FOR L1 BASED MOBILITY

(71) Applicant: Samsung Electronics Co., Ltd., Suwon-si (KR)

(72) Inventors: Anil Agiwal, Suwon-si (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 17/708,257

(22) Filed: Mar. 30, 2022

(65) Prior Publication Data

US 2022/0322207 A1 Oct. 6, 2022

(30) Foreign Application Priority Data

Mar. 30, 2021 (KR) .................. 10-2021-0041450

(51) Int. Cl.
*H04W 72/04* (2023.01)
*H04L 1/1822* (2023.01)
*H04W 24/08* (2009.01)
*H04W 48/04* (2009.01)
*H04W 72/20* (2023.01)
*H04W 72/23* (2023.01)
*H04W 36/00* (2009.01)

(52) U.S. Cl.
CPC ........... *H04W 48/04* (2013.01); *H04L 1/1822* (2013.01); *H04W 24/08* (2013.01); *H04W 72/20* (2023.01); *H04W 72/23* (2023.01); *H04W 36/0072* (2013.01)

(58) Field of Classification Search
CPC ...... H04W 48/04; H04W 72/20; H04W 72/23
See application file for complete search history.

(56) References Cited

U.S. PATENT DOCUMENTS

| | | |
|---|---|---|
| 2019/0053029 A1 | 2/2019 | Agiwal et al. |
| 2020/0236730 A1* | 7/2020 | Shin .................... H04W 56/001 |
| 2020/0314940 A1 | 10/2020 | Park et al. |
| 2020/0351020 A1 | 11/2020 | Jeon et al. |
| 2021/0051500 A1* | 2/2021 | Chae ..................... H04L 5/0048 |
| 2021/0099338 A1* | 4/2021 | Cheng ................. H04L 41/0686 |
| 2022/0117032 A1* | 4/2022 | Han ......................... H04L 1/08 |

(Continued)

FOREIGN PATENT DOCUMENTS

WO 2021/026887 A1 2/2021

OTHER PUBLICATIONS

3GPP R2-1913941; Title: Left Issues on MAC for NR-V2X; Date: Oct. 14-Oct. 18, 2019. Source: OPPO; pp. 9-10 (Year: 2019).*

(Continued)

*Primary Examiner* — Fahmida S Chowdhury
(74) *Attorney, Agent, or Firm* — Jefferson IP Law, LLP

(57) ABSTRACT

A method performed by a user equipment (UE) in a wireless communication system is provided. The method includes receiving a physical downlink control channel (PDCCH) associated with a sidelink configured grant type 2, identifying whether a number of consecutive out-of-sync indications are received from lower layer, and starting a timer in case that the number of consecutive out-of-sync indications are received, wherein the UE does not use resources of the sidelink configured grant type 2 while the timer is running.

15 Claims, 8 Drawing Sheets

(56) References Cited

U.S. PATENT DOCUMENTS

| | | | | |
|---|---|---|---|---|
| 2022/0225136 A1* | 7/2022 | Park | ............... | H04W 76/19 |
| 2022/0346082 A1* | 10/2022 | Park | ............... | H04W 92/18 |
| 2022/0377785 A1* | 11/2022 | Yao | ............... | H04L 1/1887 |
| 2023/0078336 A1* | 3/2023 | Lee | ............... | H04L 1/1825 370/329 |
| 2023/0180329 A1* | 6/2023 | Wu | ............... | H04W 76/19 370/216 |
| 2023/0189098 A1* | 6/2023 | Wu | ............... | H04W 76/38 370/331 |
| 2023/0189110 A1* | 6/2023 | Wu | ............... | H04W 36/185 370/331 |

OTHER PUBLICATIONS

Oppo, "Left issues on MAC for NR-V2X", 3GPP Draft, R2-1913941_WAS2070—Left Issues on Mac for NRV2X, 3rd Generation Partnership Project (3GPP), vol. RAN WG2, Chongqing, China, Oct. 14, 2019-Oct. 18, 2019, Oct. 7, 2019, XP051805404.

Zte et al., "Consideration on mode1 resource allocation", 3GPP Draft, R2-1914535, 3rd Generation Partnership Project (3GPP), vol. RAN WG2, Reno, USA, Nov. 18, 2019-Nov. 22, 2019, Nov. 8, 2019, XP051816601.

Mediatek Inc, "On SL configured grant", 3GPP Draft, R2-1913237, On SL Configured Grant, 3rd Generation Partnership Project (3GPP), vol. Ran WG2, Chongqing, China, Oct. 14, 2019-Oct. 18, 2019, Oct. 4, 2019, XP051791249.

Extended European Search Report dated Aug. 30, 2023, issued in European Patent Application No. 22781606.3.

International Search Report dated Jun. 30, 2022, issued in an International Application No. PCT/KR2022/004502.

Ericsson, 'Correction to SL configured grant activation and deactivation', R2-2009220, 3GPP TSG RAN WG2 #112e, Electronic meeting, Oct. 22, 2020, sections 1, 5.8.3.

'3GPP; TSG RAN; NR; RRC protocol specification (Release 16)', 3GPP TS 38.331 V16.3.1, Jan. 7, 2021, section 5.3.10.2.

Huawei et al., 'Correction to NR TC 8.1.5.6.1-RLF', R5-210645, 3GPP TSG-RAN5 Meeting #90-e, Electronic Meeting, Feb. 8, 2021, section 8.1.5.6.1.2.

\* cited by examiner

METHOD OF HANDLING COMMON CHANNEL MONITORING FOR L1 BASED MOBILITY

CROSS-REFERENCE TO RELATED APPLICATION(S)

This application is based on and claims priority under 35 U.S.C. § 119(a) of a Korean patent application number 10-2021-0041450, filed on Mar. 30, 2021, in the Korean Intellectual Property Office, the disclosure of which is incorporated by reference herein in its entirety.

BACKGROUND

1. Field

The disclosure relates to operations of a user equipment (UE) and a base station (BS) in a wireless communication system. More particularly, the disclosure relates to method of controlling configured grant (CG) type 2 resources upon detection of physical layer problem on link between UE and base station.

2. Description of Related Art

Fifth generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement sixth generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive Multiple-Input Multiple-Output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of Bandwidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random-access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide a method and an apparatus to handle CG type 2 resources upon detection of physical layer problem on link between UE and base station.

Another aspect of the disclosure is to provide a method and an apparatus for receiving paging and/or system information and performing random access procedures, upon receiving transmission configuration indicator (TCI) state update that indicates a beam for non-serving cell.

Another aspect of the disclosure is to provide a method and an apparatus for configuring preambles for small data transmission.

Additional aspects will be set forth in part in the description which follows and, in part, will be apparent from the description, or may be learned by practice of the presented embodiments.

In accordance with an aspect of the disclosure, a method performed by a user equipment (UE) in a wireless communication system is provided. The method includes receiving a physical downlink control channel (PDCCH) associated with a sidelink configured grant type 2, identifying whether a number of consecutive out-of-sync indications are received from lower layers, and starting a timer in case that the number of consecutive out-of-sync indications are received, wherein the UE does not use resources of the sidelink configured grant type 2 while the timer is running.

In accordance with another aspect of the disclosure, a user equipment (UE) in a wireless communication system is provided. The UE includes a transceiver, and a processor operably connected with the transceiver, the processor configured to receive, via the transceiver, a physical downlink control channel (PDCCH) associated with a sidelink configured grant type 2, identify whether a number of consecutive out-of-sync indications are received from lower layers, and start a timer in case that the number of consecutive out-of-sync indications are received, wherein the UE does not use resources of the sidelink configured grant type 2 while the timer is running.

In accordance with another aspect of the disclosure, a method performed by a base station in a wireless communication system is provided. The method includes identifying a type of a sidelink configured grant to allocate sidelink resources, and transmitting, to a user equipment (UE), a physical downlink control channel (PDCCH) associated with a sidelink configured grant type 2, wherein in case that a number of consecutive out-of-sync indications are received by the UE from lower layers, a timer is started, and wherein resources of the sidelink configured grant type 2 are not used by the UE while the timer is running.

In accordance with another aspect of the disclosure, a base station in a wireless communication system is provided. The base station includes a transceiver, and a processor operably connected with the transceiver, the processor configured to identify a type of a sidelink configured grant to allocate sidelink resources, and transmit, to a user equipment (UE) via the transceiver, a physical downlink control channel (PDCCH) associated with a sidelink configured grant type 2, wherein in case that a number of consecutive out-of-sync indications are received by the UE from lower layers, a timer is started, and wherein resources of the sidelink configured grant type 2 are not used by the UE while the timer is running.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
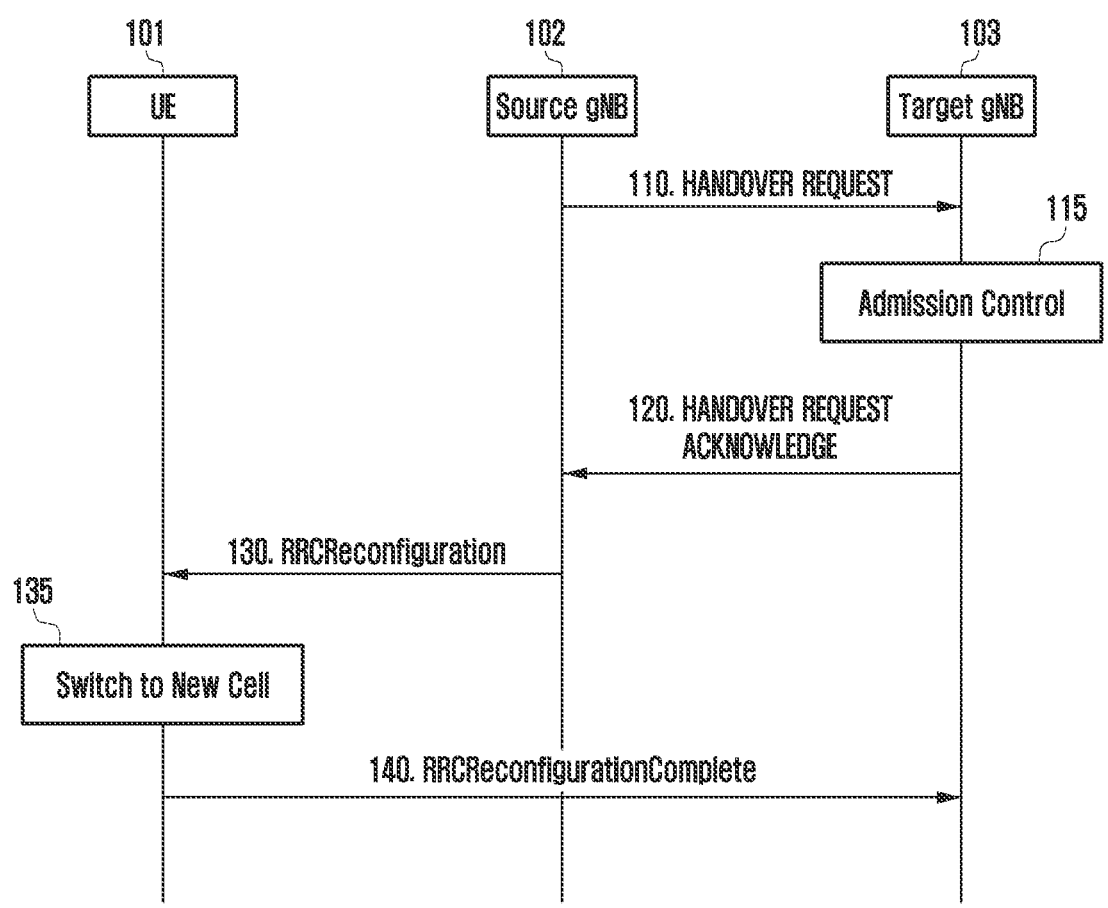
FIG. 1 illustrates an example of a signaling procedure for inter-gNode B (gNB) handover according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before undertaking the detailed description below, it can be advantageous to set forth definitions of certain words and phrases used herein. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, connect to, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C. For example, "at least one of: A, B, or C" includes any of the following combinations: A, B, C, A and B, A and C, B and C, and A and B and C.

Moreover, various functions described below can be implemented or supported by one or more computer programs, each of which is formed from computer-readable program code and embodied in a computer-readable medium. The terms "application" and "program" refer to one or more computer programs, software components, sets of instructions, procedures, functions, objects, classes, instances, related data, or a portion thereof adapted for implementation in a suitable computer-readable program code. The phrase "computer-readable program code" includes any type of computer code, including source code, object code, and executable code. The phrase "computer-readable medium" includes any type of medium capable of being accessed by a computer, such as Read-Only Memory (ROM), Random Access Memory (RAM), a hard disk drive, a Compact Disc (CD), a Digital Video Disc (DVD), or any other type of memory. A "non-transitory" computer-readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Terms used herein to describe the embodiments are not intended to limit and/or define the scope of the disclosure. For example, unless otherwise defined, the technical terms or scientific terms used in the disclosure shall have the ordinary meaning understood by those with ordinary skills in the art to which the disclosure belongs.

It should be understood that "first", "second" and similar words used in the disclosure do not express any order, quantity or importance, but are only used to distinguish different components. Unless otherwise indicated by the context clearly, similar words such as "a", "an" or "the" in a singular form do not express a limitation of quantity, but express an existence of at least one.

As used herein, any reference to "one example" or "example", and "one embodiment" or "embodiment" means that particular elements, features, structures or characteristics described in connection with the embodiment is included in at least one embodiment. The phrases "in one embodiment" or "in one example" appearing in different places do not necessarily refer to the same embodiment.

It will be further understood that similar words such as the term "include" or "comprise" mean that elements or objects appearing before the word encompass the listed elements or objects appearing after the word and their equivalents, but other elements or objects are not excluded. Similar words such as "connect" or "connected" are not limited to physical or mechanical connection, but can include electrical connection, whether direct or indirect. "Upper", "lower", "left" and "right" are only used to express a relative positional relationship, and when an absolute position of the described object changes, the relative positional relationship may change accordingly.

The various embodiments discussed below for describing the principles of the disclosure herein are for illustration purposes only and should not be interpreted as limiting the scope of the disclosure in any way. Those skilled in the art will understand that the principles of the disclosure can be implemented in any suitably arranged wireless communication system. For example, although the following detailed description of the embodiments of the disclosure will be directed to long term evolution (LTE) and/or 5G, those skilled in the art can understand that the main points of the disclosure can also be applied to other communication systems with similar technical backgrounds and channel formats with slight modifications without departing from the scope of the disclosure.

In the description of the disclosure, when it is considered that some detailed explanations about functions or configurations may unnecessarily obscure the essence of the disclosure, these detailed explanations will be omitted. All terms (including descriptive or technical terms) used herein should be interpreted as having meanings apparent to those of ordinary skill in the art. However, these terms may have different meanings according to the intention of those of ordinary skill in the art, precedents or the emergence of new technologies, and therefore, the terms used herein must be defined based on the meanings of these terms together with the description provided herein. Hereinafter, for example, the base station may be at least one of a gNode B, an eNode B (eNB), a Node B, a radio access unit, a base station controller, and a node on a network. The terminal may include a user equipment (UE), a mobile station (MS), a mobile phone, a smart phone, a computer or multimedia system capable of performing communication functions. In some embodiments of the disclosure, the downlink (DL) is a wireless transmission path through which signals are transmitted from a base station to a terminal, and the uplink (UL) is a wireless transmission path through which signals are transmitted from a terminal to a base station. In addition, one or more embodiments may be applied to 5G wireless communication technologies (5G, new radio (NR)) developed after long term evolution advanced (LTE-A), or to new wireless communication technologies proposed on the basis of fourth generation (4G) or 5G (for example, beyond 5G (B5G) or 6G).

Hereinafter, the embodiments of the disclosure will be described in detail with reference to the accompanying drawings. It should be noted that the same reference numerals in different drawings will be used to refer to the same elements already described.

CA/Multi-Connectivity in Fifth Generation Wireless Communication System:

The fifth generation wireless communication system, supports standalone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in RRC_CONNECTED is configured to utilize radio resources provided by two distinct schedulers, located in two different nodes connected via a non-ideal backhaul and providing either evolved-universal terrestrial radio access (E-UTRA) (i.e., if the node is an ng-eNB) or NR access (i.e., if the node is a gNB). In NR for a UE in RRC_CONNECTED not configured with carrier aggregation (CA)/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the PCell and optionally one or more secondary cells (SCells). In NR the term Secondary Cell Group (SCG) refers to a group of serving cells associated with the Secondary Node, comprising of the PSCell and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e., Special Cell) refers to the PCell of the MCG or the PSCell of the SCG, otherwise the term Special Cell refers to the PCell.

System Information Acquisition in Fifth Generation Wireless Communication System:

In the fifth generation wireless communication system, node B (gNB) or base station in cell broadcast Synchronization Signal and physical broadcast channel (PBCH) block (SSB) consists of primary and secondary synchronization signals (PSS, SSS) and system information. System information includes common parameters needed to communicate in cell. In the fifth generation wireless communication system (also referred as next generation radio or NR), System Information (SI) is divided into the master information block (MIB) and a number of system information blocks (SIBs) where:

The MIB is always transmitted on the BCH with a periodicity of 80 ms and repetitions made within 80 ms and it includes parameters that are needed to acquire SIB1 from the cell.

The SIB1 is transmitted on the DL-SCH with a periodicity of 160 ms and variable transmission repetition. The default transmission repetition periodicity of SIB1 is 20 ms but the actual transmission repetition periodicity is up to network implementation. For SSB and CORESET multiplexing pattern 1, SIB1 repetition transmission period is 20 ms. For SSB and CORESET multiplexing pattern 2/3, SIB1 transmission repetition period is the same as the SSB period. SIB1 includes information regarding the availability and scheduling (e.g., mapping of SIBs to SI message, periodicity, SI-window size) of other SIBs with an indication whether one or more SIBs are only provided on-demand and, in that case, the configuration needed by the UE to perform the SI request. SIB1 is cell-specific SIB;

SIBs other than SIB1 and posSIBs are carried in System-Information (SI) messages, which are transmitted on the DL-SCH. Only SIBs or posSIBs having the same periodicity can be mapped to the same SI message. SIBs and posSIBs are mapped to the different SI messages. Each SI message is transmitted within periodically occurring time domain windows (referred to as SI-windows with same length for all SI messages). Each SI message is associated with an SI-window and the SI-windows of different SI messages do not overlap. That is, within one SI-window only the corresponding SI message is transmitted. An SI message may be transmitted a number of times within the SI-window. Any SIB or posSIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformationAreaID; The mapping of SIBs to SI messages is configured in schedulingInfoList, while the mapping of posSIBs to SI messages is configured inpos-SchedulingInfoList. Each SIB is contained only in a single SI message and each SIB and posSIB is contained at most once in that SI message;

For a UE in RRC_CONNECTED, the network may provide system information through dedicated signaling using the RRCReconfiguration message, e.g., if the UE has an active BWP with no common search space configured to monitor system information, paging, or upon request from the UE. In RRC_CONNECTED, UE needs to acquire the required SIB(s) only from PCell.

For PSCell and SCells, the network provides the required SI by dedicated signaling, i.e., within an RRCReconfiguration message. Nevertheless, the UE shall acquire MIB of the PSCell to get SFN timing of the SCG (which may be different from MCG). Upon change of relevant SI for SCell, the network releases and adds the concerned SCell. For PSCell, the required SI can only be changed with Reconfiguration with Sync.

UEs in RRC_IDLE or in RRC_INACTIVE shall monitor for SI change indication on camped cell (or PCell) in its own paging occasion every DRX cycle. UEs in RRC_CONNECTED shall monitor for SI change indication on PCell in any paging occasion at least once per modification period if the UE is provided with common search space, including pagingSearchSpace, searchSpaceSIB1 and searchSpaceOtherSystemInformation, on the active BWP of PCell to monitor paging.

Earthquake and tsunami warning System (ETWS) or commercial mobile alert system (CMAS) capable UEs in RRC_IDLE or in RRC_INACTIVE shall monitor for indications about public warning system (PWS) notification on camped cell (or PCell) in its own paging occasion every DRX cycle. ETWS or CMAS capable UEs in RRC_CONNECTED shall monitor for indication about PWS notification on PCell in any paging occasion at least once every defaultPagingCycle if the UE is provided with common search space, including pagingSearchSpace, searchSpaceSIB1 and searchSpaceOtherSystemInformation, on the active BWP of PCell to monitor paging.

Random Access in Fifth Generation Wireless Communication System:

In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by non-synchronized UE in RRC CONNECTED state. Several types of random access procedure is supported such as contention based random access, contention free random access and each of these can be one 2 step or 4 step random access.

PDCCH in Fifth Generation Wireless Communication System:

In the fifth generation wireless communication system, Physical Downlink Control Channel (PDCCH) is used to schedule DL transmissions on Physical Downlink Shared Channel (PDSCH) and UL transmissions on Physical Uplink Shared Channel (PUSCH), where the Downlink Control Information (DCI) on PDCCH includes: Downlink assignments containing at least modulation and coding format, resource allocation, and hybrid-ARQ information related to DL-SCH; Uplink scheduling grants containing at least modulation and coding format, resource allocation, and hybrid-ARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the PRB(s) and OFDM symbol(s) where the UE may assume no transmission is intended for the UE; Transmission of TPC commands for PUCCH and PUSCH; Transmission of one or more TPC commands for SRS transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. QPSK modulation is used for PDCCH.

In fifth generation wireless communication system, a list of search space configurations is signaled by GNB for each configured BWP of serving cell wherein each search space configuration is uniquely identified by a search space identifier. Search space identifier is unique amongst the BWPs of a serving cell. Identifier of search space configuration to be used for specific purpose such as paging reception, SI reception, random access response reception is explicitly signaled by gNB for each configured BWP. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion(s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y*(\text{number of slots in a radio frame}) + x - \text{Monitoring-offset-PDCCH-slot}) \mod (\text{Monitoring-periodicity-PDCCH-slot}) = 0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of coreset configuration associated with it. A list of coreset configurations are signaled by GNB for each configured BWP of serving cell wherein each coreset configuration is uniquely identified by a coreset identifier. Coreset identifier is unique amongst the BWPs of a serving cell. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS is pre-defined in NR. Each coreset configuration is associated with a list of Transmission configuration indicator (TCI) states. One DL RS ID (SSB or channel state information reference signal (CSI-RS)) is configured per TCI state. The list of TCI states corresponding to a coreset configuration is signaled by gNB via RRC signaling. One of the TCI state in TCI state list is activated and indicated to UE by gNB. TCI state indicates the DL TX beam (DL TX beam is QCLed with SSB/CSI RS of TCI state) used by GNB for transmission of PDCCH in the PDCCH monitoring occasions of a search space.

BWP Operation in Fifth Generation Wireless Communication System:

In fifth generation wireless communication system, bandwidth adaptation (BA) is supported. With BA, the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the subcarrier spacing can be ordered to change (e.g., to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e., it does not have to monitor PDCCH on the entire DL frequency of the serving cell. In RRC connected state, UE is configured with one or more DL and UL BWPs, for each configured Serving Cell (i.e., PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the medium access control (MAC) entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

Mobility in Fifth Generation Wireless Communication System:

There are two types of mobility, cell level mobility and beam level mobility. Cell Level Mobility requires explicit RRC signaling to be triggered, i.e., handover. For inter-gNB handover, the signaling procedures consist of at least the following elemental components as shown in FIG. 1.

FIG. 1 illustrates an example of a signaling procedure for inter-gNB handover according to an embodiment of the disclosure.

The source gNB (102) initiates handover and issues a HANDOVER REQUEST over the Xn interface (110). The target gNB (103) performs admission control (115) and provides the new RRC configuration as part of the HANDOVER REQUEST ACKNOWLEDGE (120). The source gNB provides the RRC configuration to the UE (101) by forwarding the RRCReconfiguration message (130) received in the HANDOVER REQUEST ACKNOWLEDGE. The RRCReconfiguration message includes at least cell ID and all information required to access the target cell so that the UE can access the target cell without reading system information. For some cases, the information required for contention-based random access and contention-free random access may be included in the RRCReconfiguration message. The access information to the target cell may include beam specific information, if any. The UE moves the RRC connection to the target gNB (S135) and replies with the RRCReconfigurationComplete (140). Several types of handover, e.g., normal handover, conditional handover and DAPS handover are supported.

Beam Level Mobility does not require explicit RRC signaling to be triggered. The gNB provides for serving cell via RRC signaling the UE with measurement configuration containing configurations of SSB/CSI resources and resource sets, reports and trigger states for triggering channel and interference measurements and reports. Beam Level Mobility is then dealt with at lower layers by means of physical layer and MAC layer control signaling, and RRC is not required to know which beam is being used at a given point in time. Based on physical layer and MAC layer control signaling UE may be switched from one beam to another in serving cell.

Recently, third generation partnership project (3GPP) has started work to enhance mobility procedures to enable layer 1 (L1)/layer 2 (L2) centric inter cell mobility. UE receives, from serving cell, configuration of SSBs/channel state information-reference signals (CSI-RSs) of non-serving cell for beam measurement. Non serving cell is a neighbor cell which is not one of the serving cell within the configured cell group(s). UE performs beam measurement and report to serving cell. UE receives, from serving cell, information on TCI state update (beam indication), indicating/activating beam of non-serving cell. UE starts receiving UE-dedicated PDSCH, PDCCH from non-serving cell. UE starts transmitting UE-dedicated PUSCH, and PUCCH to non-serving cell. Note that the serving cell and non-serving cell have different physical cell identifier (PCI). Upon receiving information on TCI state update indicating beam for non-serving cell, following aspects needs be addressed:

How/from where does UE receive paging (for SI update notification/emergency notifications)?
How/from where does UE receive system information?
Where does UE perform random access?

Hereinafter, a method for receiving paging/system information and performing random access upon receiving information on TCI state update that indicates a beam of a non-serving cell will be described in detail below.

Method 1: Common Channel Monitoring Upon Beam Change from Serving Cell to Non-Serving Cell Embodiment 1

Figure 2:
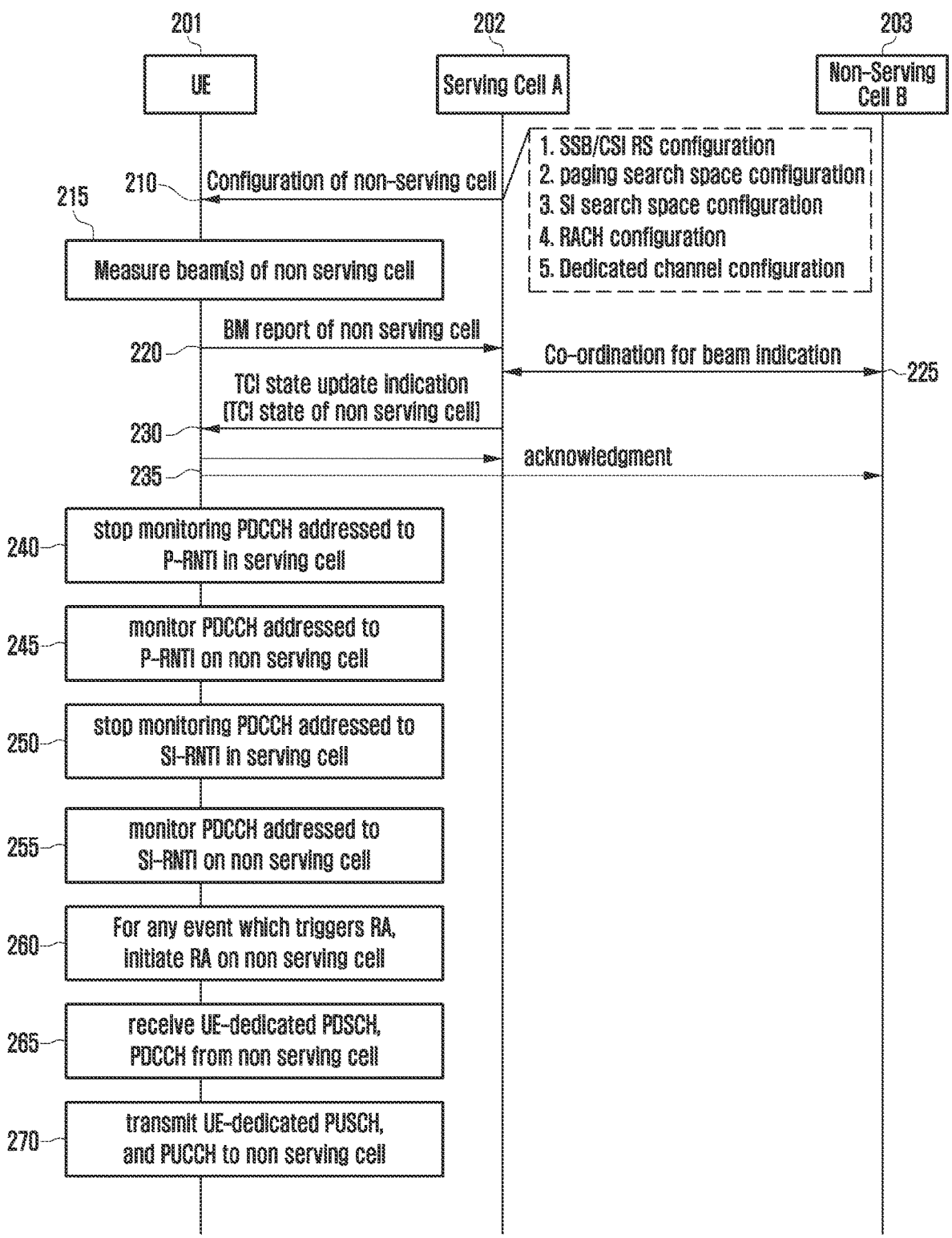
FIG. 2 illustrates an example of a signaling flow between a UE and a network upon beam change from serving cell to non-serving cell according to an embodiment of the disclosure.

FIG. 2 illustrates an example of a signaling flow between a UE and a network upon beam change from serving cell (or from TRP of a serving cell) to non-serving cell (or to another TRP of serving cell with different PCI other than PCI of serving cell) according to an embodiment of the disclosure. Here 'Serving Cell' may also be referred as a TRP of serving cell with same PCI as serving cell. 'Non-serving cell' may be referred as a TRP of serving cell with different PCI other than PCI of serving cell. Non-serving cell may also be referred as auxiliary cell.

1. UE (201) receives, from a serving cell (202) (e.g., PCell), a configuration (210) of a non-serving cell (203). The configuration of non-serving cell may be received for one or more non-serving cells. The non-serving cell (203) is a neighbor cell which is not one of the serving cells within the configured cell group(s). The non-serving cell is associated with one of serving cells. In an embodiment, associated serving cell of non-serving cell may always be the SpCell. In an embodiment, associated serving cell of non-serving cell may be SCell or SpCell. This association between the serving cell and the non-serving cell may be signaled in the configuration. The association may be implicitly indicated by including non-serving configuration in serving cell configuration of associated serving cell. RRCReconfiguration message may be used for the configuration of non-serving cell. For example, RRCReconfiguration message includes the configuration of non-serving cell.

Configuration of non-serving cell includes beam measurement configuration such as SSBs/CSI-RSs to measure, time and frequency resources of SSBs/CSI-RSs, quantity to measure and report, number of SSBs/CSI-RSs to report, quasi-co location (QCL) information of SSBs/CSI-RSs with respect to SSBs/CSI-RSs in serving cell (e.g., signaling may indicate which SSB/CSI-RS of non-serving cell is QCLed with which SSB/CSI-RS of serving cell and which serving cell), threshold for reporting a SSB/CSI-RS in report, reporting type (e.g., periodic, period of reporting if periodic) etc.

Configuration of non-serving cell includes paging search space configuration (e.g., search space and corset to measure) for monitoring PDCCH for paging in non-serving cell.

Configuration includes system information search space configuration (e.g., search space and corset to measure, searchSpaceSIB1, searchSpaceOtherSystemInformation) for monitoring PDCCH for system information in non-serving cell.

Configuration of non-serving cell includes RACH configuration (e.g., RAR search space and CORESET to measure, RACH resources (preambles config, RACH occasion config, etc.) and parameters) for performing RA in non-serving cell. Configuration of non-serving cell may include configuration of one or more BWPs of non-serving cell. Configuration of non-serving cell may indicate which BWP of non-serving cell should be activated upon reception of TCI state update indication activating TCI state of non-serving cell; if not indicated the BWP with BWP id of active BWP on serving cell is activated on non-serving cell. Configuration of non-serving cell may include C-RNTI, CS-RNTI to be used in non-serving cell; if not included UE continue to use C-RNTI, CS-RNTI of serving cell in non-serving cell upon activation of TCI state of non-serving cell. Configuration of non-serving cell may indicate whether to perform RACH or not upon activation of TCI state of non-serving cell.

2. UE performs measurement of SSBs/CSI-RSs of non-serving cell as per the received configuration (215) and report information on the measurement result to serving cell (220). Serving cell coordinates with non-serving cell (225) and determines whether to activate TCI state of non-serving cell or not. Serving cell may indicate one or more TCI states of non-serving cell which can be activated based on report from UE or alternately serving cell can send the report to non-serving cell and non-serving cell indicates the TCI state to be activated to serving cell. In an alternate embodiment, determination of TCI state of non-serving cell to be activated may be taken by serving cell itself based on report from UE.

3. Serving cell indicates to UE the TCI state of non-serving cell to be activated (230). The indication may be via PDCCH or MAC control element (CE). MAC CE may include one or more of TCI state ID, corset ID, cell identification (e.g., cell ID).

4. Upon receiving, from serving cell, information on TCI state update (beam indication) indicating/activating beam/TCI state of non-serving cell, UE may send an acknowledgment (235). The acknowledgment may be sent to serving cell. Alternately, the acknowledgment may be sent to non-serving cell. The acknowledgment may be L1 signal such as PUCCH or MAC CE or Physical Random Access Channel (PRACH).

5. Upon activation of TCI state of non-serving cell, UE activates the UL BWP and DL BWP of non-serving cell. Configuration of non-serving cell may indicate which BWP of non-serving cell should be activated upon reception of information on TCI state update indication activating TCI state of non-serving cell; if not indicated the BWP with BWP id of active BWP on serving cell is activated on non-serving cell; or alternately, information on TCI state update indication may indicate the BWP to be activated (information may include BWP ID of DL BWP to be activated, BWP ID of UL BWP to be activated; information may be include BWP ID of BWP to be activated, BWP ID is same for both DL BWP and UL BWP). Upon activation of TCI state of non-serving cell, UE deactivates the active DL BWP of associated serving cell and deactivates the active UL BWP of associated serving cell. Later if TCI state of associated serving cell is activated, UE activates the first active DL BWP and activates the first active UL BWP of associated serving cell and UE deactivates the active DL BWP and deactivates the active UL BWP of non-serving cell. (Alternate) Later if TCI state of associated serving cell is activated, UE activates the DL BWP and activates the UL BWP of associated serving cell which was last active and UE deactivates the active DL BWP of non-serving cell and deactivates the active UL BWP of non-serving cell.

6. Upon activation of TCI state of non-serving cell, UE starts receiving UE-dedicated PDSCH, PDCCH from non-serving cell (265). UE starts transmitting UE-dedicated PUSCH, and PUCCH to non-serving cell (270). UE stops receiving UE-dedicated PDSCH, PDCCH from serving cell associated with non-serving cell. UE stops transmitting UE-dedicated PUSCH, and PUCCH to serving cell associated with non-serving cell. In an embodiment, associated serving cell may always be the SpCell. In an embodiment, associated serving cell may be SCell or SpCell.

7. Upon activation of TCI state of non-serving cell, UE stops monitoring PDCCH addressed to paging radio network temporary identifier (P-RNTI) (i.e., SI update/emergency notifications) in serving cell (associated with the non-serving cell) (240). UE monitors PDCCH addressed to P-RNTI on the non-serving cell according to received paging search space configuration (e.g., pagingSearchSpace) of the non-serving cell (245). Paging search space configuration of non-serving cell is signaled by serving cell.

8. Upon activation of TCI state of non-serving cell, UE stops monitoring PDCCH addressed to SI-RNTI in serving cell (associated with the non-serving cell) (250). UE acquires the required SIB(s) from the non-serving cell. UE monitors PDCCH addressed to SI-RNTI in non-serving cell according to received search space configuration (e.g., searchSpaceSIB1, searchSpaceOtherSystemInformation) of the non-serving cell (255). SearchSpaceSIB1 and searchSpaceOtherSystemInformation of the non-serving cell is signaled by serving cell.

9. Upon activation of TCI state of non-serving cell, RACH (when triggered) is performed on the non-serving cell (260). RACH configuration of non-serving cell is signaled by serving cell.

10. Upon activation of TCI state of non-serving cell, UE acquires MIB/SSBs on the non-serving cell.

In an embodiment, operation in para 7 and para 8 above is performed only if non-serving cell is associated with PCell.

Embodiment 2

Figure 3:
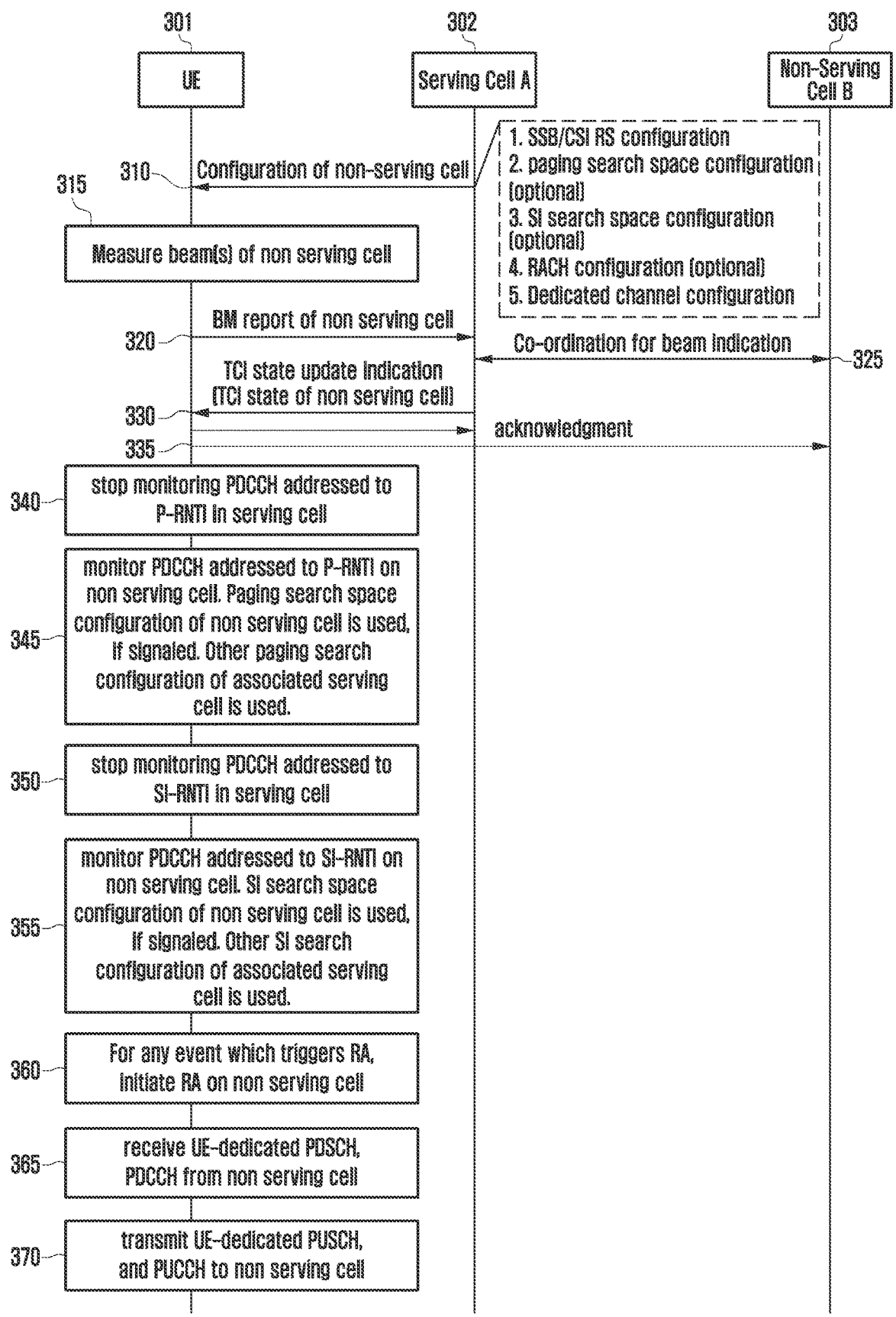
FIG. 3 illustrates another example of a signaling flow between a UE and a network upon beam change from serving cell to non-serving cell according to an embodiment of the disclosure.

FIG. 3 illustrates an example of a signaling flow between UE and network upon beam change from serving cell to non-serving cell, according to an embodiment of the disclosure. Here 'Serving Cell' may also be referred as a TRP of serving cell with same PCI as serving cell. 'Non-serving cell' may be referred as a TRP of serving cell with different PCI other than PCI of serving cell. Non-serving cell may also be referred as auxiliary cell.

1. UE (301) receives, from serving cell (302) (e.g., PCell), a configuration (310) of a non-serving cell (303). The configuration of the non-serving cell may be received for multiple non-serving cells. The non-serving cell (303) is a neighbor cell which is not one of the serving cells within the configured cell group(s). The non-serving cell is associated with one of serving cells. In an embodiment, associated serving cell of non-serving cell may always be the SpCell. In an embodiment, associated serving cell of non-serving cell may be SCell or SpCell. This association between the serving cell and the non-serving cell may be signaled in the configuration. The association may be implicitly indicated by including non-serving configuration in serving cell configuration of associated serving cell. RRCReconfiguration message may be used for the configuration of the non-serving cell. For example, RRCReconfiguration message includes the configuration of non-serving cell.

Configuration of non-serving cell includes beam measurement configuration such as SSBs/CSI-RSs to measure, time and frequency resources of SSBs/CSI-RSs, quantity to measure and report, number of SSBs/CSI-RSs to report, QCL information of SSBs/CSI-RSs with respect to SSBs/CSI-RSs in serving cell (e.g., signaling may indicate which SSB/CSI-RS of non-serving cell is QCLed with which SSB/CSI-RS of serving cell and which serving cell), threshold for reporting a SSB/CSI-RS in report, reporting type (e.g., periodic, period of reporting if periodic) etc.

Configuration of non-serving cell may include paging search space configuration (e.g., search space and corset to measure) for monitoring PDCCH for paging in non-serving cell.

Configuration may include system information search space configuration (e.g., search space and corset to measure, searchSpaceSIB1, searchSpaceOtherSystemInformation) for monitoring PDCCH for system information in non-serving cell.

Configuration of non-serving cell may include RACH configuration (e.g., RAR search space and CORESET to measure, RACH resources (preambles config, RACH occasion config, etc.) and parameters) for performing RA in non-serving cell. Configuration of non-serving cell may include configuration of one or more BWPs of non-serving cell. Configuration of non-serving cell may indicate which BWP of non-serving cell should be activated upon reception of TCI state update indication activating TCI state of non-serving cell; if not indicated the BWP with BWP id of active BWP on serving cell is activated on non-serving cell. Configuration of non-serving cell may include C-RNTI, CS-RNTI to be used in non-serving cell; if not included UE continue to use C-RNTI, CS-RNTI of serving cell in non-serving cell upon activation of TCI state of non-serving cell. Configuration of non-serving cell may indicate whether to perform RACH or not upon activation of TCI state of non-serving cell.

2. UE performs measurement of SSBs/CSI-RSs of non-serving cell as per the received configuration (315) and report information on the measurement result to serving cell (320). Serving cell coordinates with non-serving cell (325) and determines whether to activate TCI state of non-serving cell or not. Serving cell may indicate one or more TCI states of non-serving cell which can be activated based on report from UE or alternately serving cell may send the report to non-serving cell and non-serving cell indicates the TCI state to be activated to serving cell. In an alternate embodiment, determination of TCI state of non-serving cell to be activated may be taken by serving cell itself based on report from UE.

3. Serving cell indicates to UE the TCI state of non-serving cell to be activated (330). The indication may be via PDCCH or MAC CE. MAC CE may include one or more of TCI state ID, corset ID, cell identification (e.g., cell ID).

4. Upon receiving, from serving cell, information on TCI state update (beam indication) indicating/activating beam/TCI state of non-serving cell, UE may send an acknowledgment (335). The acknowledgment may be sent to serving cell. Alternately, the acknowledgment may be sent to non-serving cell. The acknowledgment may be L1 signal such as PUCCH or MAC CE or PRACH.

5. Upon activation of TCI state of non-serving cell, UE activates the UL BWP and DL BWP of non-serving cell. Configuration of non-serving cell may indicate which BWP of non-serving cell should be activated upon reception of information on TCI state update indication activating TCI state of non-serving cell; if not indicated the BWP with BWP id of active BWP on serving cell is activated on non-serving cell; or alternately, information on TCI state update indication may indicate the BWP to be activated (information may include BWP ID of DL BWP to be activated, BWP ID of UL BWP to be activated; information may be include BWP ID of BWP to be activated, BWP ID is same for both DL BWP and UL BWP). Upon activation of TCI state of non-serving cell, UE deactivates the active DL BWP of associated serving cell and deactivates the active UL BWP of associated serving cell. Later if TCI state of associated serving cell is activated, UE activates the first active DL BWP and activates the first active UL BWP of associated serving cell and UE deactivates the active DL BWP and deactivates the active UL BWP of non-serving cell. (Alternate) Later if TCI state of associated serving cell is activated, UE activates the DL BWP and activates the UL BWP of associated serving cell which was last active and UE deactivates the active DL BWP of non-serving cell and deactivates the active UL BWP of non-serving cell.

6. Upon activation of TCI state of non-serving cell, UE starts receiving UE-dedicated PDSCH, PDCCH from non-serving cell (365). UE starts transmitting UE-dedicated PUSCH, and PUCCH to non-serving cell (370). UE stops receiving UE-dedicated PDSCH, PDCCH from serving cell associated with non-serving cell. UE stops transmitting UE-dedicated PUSCH, and PUCCH to serving cell associated with non-serving cell. In an embodiment, associated serving cell may always be the SpCell. In an embodiment, associated serving cell may be SCell or SpCell.

7. Upon activation of TCI state of non-serving cell, UE stops monitoring PDCCH addressed to P-RNTI (i.e., SI update/emergency notifications) in serving cell (associated with the non-serving cell) (340). UE monitors PDCCH addressed to P-RNTI on the non-serving cell according to received paging search space configuration (e.g., paging-SearchSpace) of the non-serving cell (345) if paging search space configuration of the non-serving cell is configured (i.e., received from serving cell in para 1). Otherwise, UE monitors PDCCH addressed to P-RNTI on the non-serving cell according to received paging search space configuration of the associated serving cell; in an embodiment, UE may use the paging search space configuration of current active DL BWP of associated serving cell; in an embodiment, UE may use the paging search space configuration of DL BWP of associated serving cell with same BWP ID as the activated DL BWP of non-serving cell.

8. Upon activation of TCI state of non-serving cell, UE stops monitoring PDCCH addressed to SI-RNTI in serving cell (associated with the non-serving cell) (350). UE acquires the required SIB(s) from the non-serving cell. UE monitors PDCCH addressed to SI-RNTI in non-serving cell according to received SI search space configuration of the non-serving cell (355) if SI search space configuration of the non-serving cell is configured (i.e., received from serving cell in para 1). Otherwise, UE monitors PDCCH addressed to SI-RNTI on the non-serving cell according to received SI search space configuration of the associated serving cell; in an embodiment, UE may use the SI search space configuration of current active DL BWP of associated serving cell; in an embodiment, UE may use the SI search space configuration of DL BWP of associated serving cell with same BWP ID as the activated DL BWP of non-serving cell. SI search space configuration is searchSpaceSIB1 and searchSpaceOtherSystemInformation.

9. Upon activation of TCI state of non-serving cell, RACH (when triggered) is performed on the non-serving cell (360). RACH configuration of non serving cell is used if configured. Otherwise, UE performs RACH on the non-serving cell according to received RACH configuration of the associated serving cell; in an embodiment, UE may use the RACH configuration of current active DL BWP of associated serving cell (UE may use the RACH configuration of initial DL BWP of associated serving cell, if current active DL BWP of associated serving cell does not include RACH configuration); in an embodiment, UE may use the RACH configuration of DL BWP of associated serving cell with same BWP ID as the activated DL BWP of non-serving cell (UE may use the RACH configuration of initial DL BWP of associated serving cell, if DL BWP of associated serving cell with same BWP ID as the activated DL BWP of non-serving cell does not include RACH configuration.

10. Upon activation of TCI state of non-serving cell, UE acquires MIB/SSBs on the non-serving cell.

In an embodiment, operation in para 7 and para 8 above is performed only if non-serving cell is associated with PCell.

Embodiment 3

Figure 4:
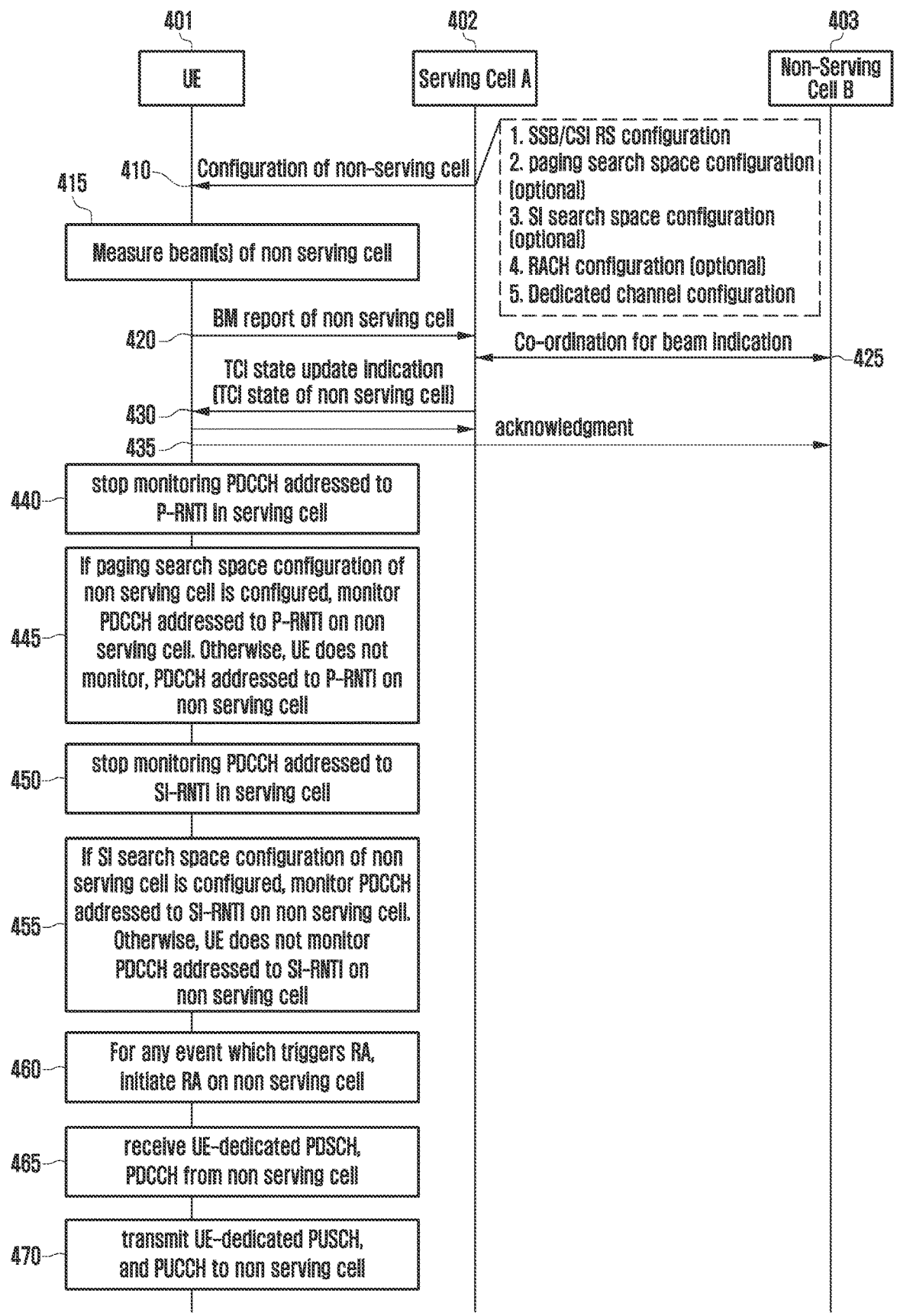
FIG. 4 illustrates another example of a signaling flow between a UE and a network upon beam change from serving cell to non-serving cell according to an embodiment of the disclosure.

FIG. 4 illustrates an example of a signaling flow between UE and network upon beam change from serving cell to non-serving cell, according to an embodiment of the disclosure. Here 'Serving Cell' may also be referred as a TRP of serving cell with same PCI as serving cell. 'Non-serving cell' may be referred as a TRP of serving cell with different PCI other than PCI of serving cell. Non-serving cell may also be referred as auxiliary cell.

1. UE (401) receives, from a serving cell (402) (e.g., PCell), a configuration (410) of a non-serving cell (403). The configuration of the non-serving cell may be received for multiple non-serving cells. The non-serving cell (403) is a neighbor cell which is not one of the serving cells within the configured cell group(s). The non-serving cell is associated with one of serving cells. In an embodiment, associated serving cell of non-serving cell may always be the SpCell. In an embodiment, associated serving cell of non-serving cell may be SCell or SpCell. This association between the serving cell and the non-serving cell may be signaled in the configuration. The association may be implicitly indicated by including non-serving configuration in serving cell configuration of associated serving cell. RRCReconfiguration message may be used for the configuration. For example, RRCReconfiguration message includes the configuration of non-serving cell.

Configuration of non-serving cell includes beam measurement configuration such as SSBs/CSI-RSs to measure, time and frequency resources of SSBs/CSI-RSs, quantity to measure and report, number of SSBs/CSI-RSs to report, QCL information of SSBs/CSI-RSs with respect to SSBs/CSI-RSs in serving cell (e.g., signaling may indicate which SSB/CSI-RS of non-serving cell is QCLed with which SSB/CSI-RS of serving cell and which serving cell), threshold for reporting a SSB/CSI-RS in report, reporting type (e.g., periodic, period of reporting if periodic) etc.

Configuration of non-serving cell may include paging search space configuration (e.g., search space and corset to measure) for monitoring PDCCH for paging in non-serving cell.

Configuration may include system information search space configuration (e.g., search space and corset to measure, searchSpaceSIB1, searchSpaceOtherSystemInformation) for monitoring PDCCH for system information in non-serving cell.

Configuration of non-serving cell may include RACH configuration (e.g., RAR search space and CORESET to measure, RACH resources (preambles config, RACH occasion config, etc.) and parameters) for performing RA in non-serving cell. Configuration of non-serving cell may include configuration of one or more BWPs of non-serving cell. Configuration of non-serving cell may indicate which BWP of non-serving cell should be activated upon reception of TCI state update indication activating TCI state of non-serving cell; if not indicated the BWP with BWP id of active BWP on serving cell is activated on non-serving cell. Configuration of non-serving cell may include C-RNTI, CS-RNTI to be used in non-serving cell; if not included UE continue to use C-RNTI, CS-RNTI of serving cell in non-serving cell upon activation of TCI state of non-serving cell. Configuration of non-serving cell may indicate whether to perform RACH or not upon activation of TCI state of non-serving cell.

2. UE performs measurement of SSBs/CSI-RSs of non-serving cell as per the received configuration (415) and report information on the measurement result to serving cell (420). Serving cell coordinates with non-serving cell (425) and determines whether to activate TCI state of non-serving cell or not. Serving cell may indicate one or more TCI states of non-serving cell which can be activated based on report from UE or alternately serving cell may send the report to non-serving cell and non-serving cell indicates the TCI state to be activated to serving cell. In an alternate embodiment, determination of TCI state of non-serving cell to be activated may be taken by serving cell itself based on report from UE.

3. Serving cell indicates to UE the TCI state of non-serving cell to be activated (430). The indication may be via PDCCH or MAC CE. MAC CE may include one or more of TCI state ID, corset ID, cell identification (e.g., cell ID).

4. Upon receiving, from serving cell, information on TCI state update (beam indication) indicating/activating beam/TCI state of non-serving cell, UE may send an acknowledgment (435). The acknowledgment may be sent to serving cell. Alternately the acknowledgment may be sent to non-serving cell. The acknowledgment may be L1 signal such as PUCCH or MAC CE or PRACH.

5. Upon activation of TCI state of non-serving cell, UE activates the UL BWP and DL BWP of non-serving cell. Configuration of non-serving cell may indicate which BWP of non-serving cell should be activated upon reception of information on TCI state update indication activating TCI state of non-serving cell; if not indicated the BWP with BWP id of active BWP on serving cell is activated on non-serving cell; or alternately, information on TCI state update indication may indicate the BWP to be activated (information may include BWP ID of DL BWP to be activated, BWP ID of UL BWP to be activated; information may be include BWP ID of BWP to be activated, BWP ID is same for both DL BWP and UL BWP). Upon activation of TCI state of non-serving cell, UE deactivates the active DL BWP of associated serving cell and deactivates the active UL BWP of associated serving cell. Later if TCI state of associated serving cell is activated, UE activates the first active DL BWP and activates the first active UL BWP of associated serving cell and UE deactivates the active DL BWP and deactivates the active UL BWP of non-serving cell. (Alternate) Later if TCI state of associated serving cell is activated, UE activates the DL BWP and activates the UL BWP of associated serving cell which was last activated and UE deactivates the active DL BWP of non-serving cell and deactivates the active UL BWP of non-serving cell.

6. Upon activation of TCI state of non-serving cell, UE starts receiving UE-dedicated PDSCH, PDCCH from non-serving cell (465). UE starts transmitting UE-dedicated PUSCH, and PUCCH to non-serving cell (470). UE stops receiving UE-dedicated PDSCH, PDCCH from serving cell associated with non-serving cell. UE stops transmitting UE-dedicated PUSCH, and PUCCH to serving cell associated with non-serving cell. In an embodiment, associated serving cell may always be the SpCell. In an embodiment, associated serving cell may be SCell or SpCell.

7. Upon activation of TCI state of non-serving cell, UE stops monitoring PDCCH addressed to P-RNTI (i.e., SI update/emergency notifications) in serving cell (associated with the non-serving cell) (440). UE monitors PDCCH addressed to P-RNTI on the non-serving cell according to received paging search space configuration of the non-serving cell if paging search space configuration of the non-serving cell is configured (i.e., received from serving cell in para 1) (445). If paging search space configuration of the non-serving cell is not configured, UE does not monitor PDCCH addressed to P-RNTI on the non-serving cell; emergency SIB(s) in case of emergency notifications are signaled to UE using dedicated RRC message.

8. Upon activation of TCI state of non-serving cell, UE stops monitoring PDCCH addressed to SI-RNTI in serving cell (associated with the non-serving cell) (450). UE acquires the required SIB(s) from the non-serving cell. UE monitors PDCCH addressed to SI-RNTI in non-serving cell according to received SI search space configuration of the non-serving cell if SI search space configuration of the non-serving cell is configured (i.e., received from serving cell in para 1) (455). If SI search space configuration of the non-serving cell is not configured, UE does not monitor PDCCH addressed to SI-RNTI on the non-serving cell; required SIB(s) in case of SI update are signaled to UE using dedicated RRC message.

SI search space configuration is searchSpaceSIB1 and searchSpaceOtherSystemInformation.

9. Upon activation of TCI state of non-serving cell, RACH (when triggered) is performed on the non-serving cell (460). RACH configuration of non-serving cell is used if configured. Otherwise, UE performs RACH on the non-serving cell according to received RACH configuration of the associated serving cell; in an embodiment, UE may use the RACH configuration of current active DL BWP of associated serving cell (UE may use the RACH configuration of initial DL BWP of associated serving cell, if current active DL BWP of associated serving cell does not include RACH configuration); in an embodiment, UE may use the RACH configuration of DL BWP of associated serving cell with same BWP ID as the activated DL BWP of non-serving cell (UE may use the RACH configuration of initial DL BWP of associated serving cell, if DL BWP of associated serving cell with same BWP ID as the activated DL BWP of non-serving cell does not include RACH configuration.

10. Upon activation of TCI state of non-serving cell, UE acquires MIB/SSBs on the non-serving cell.

In an embodiment, operation in para 7 and para 8 above is performed only if non-serving cell is associated with PCell.

Embodiment 4

Figure 5:
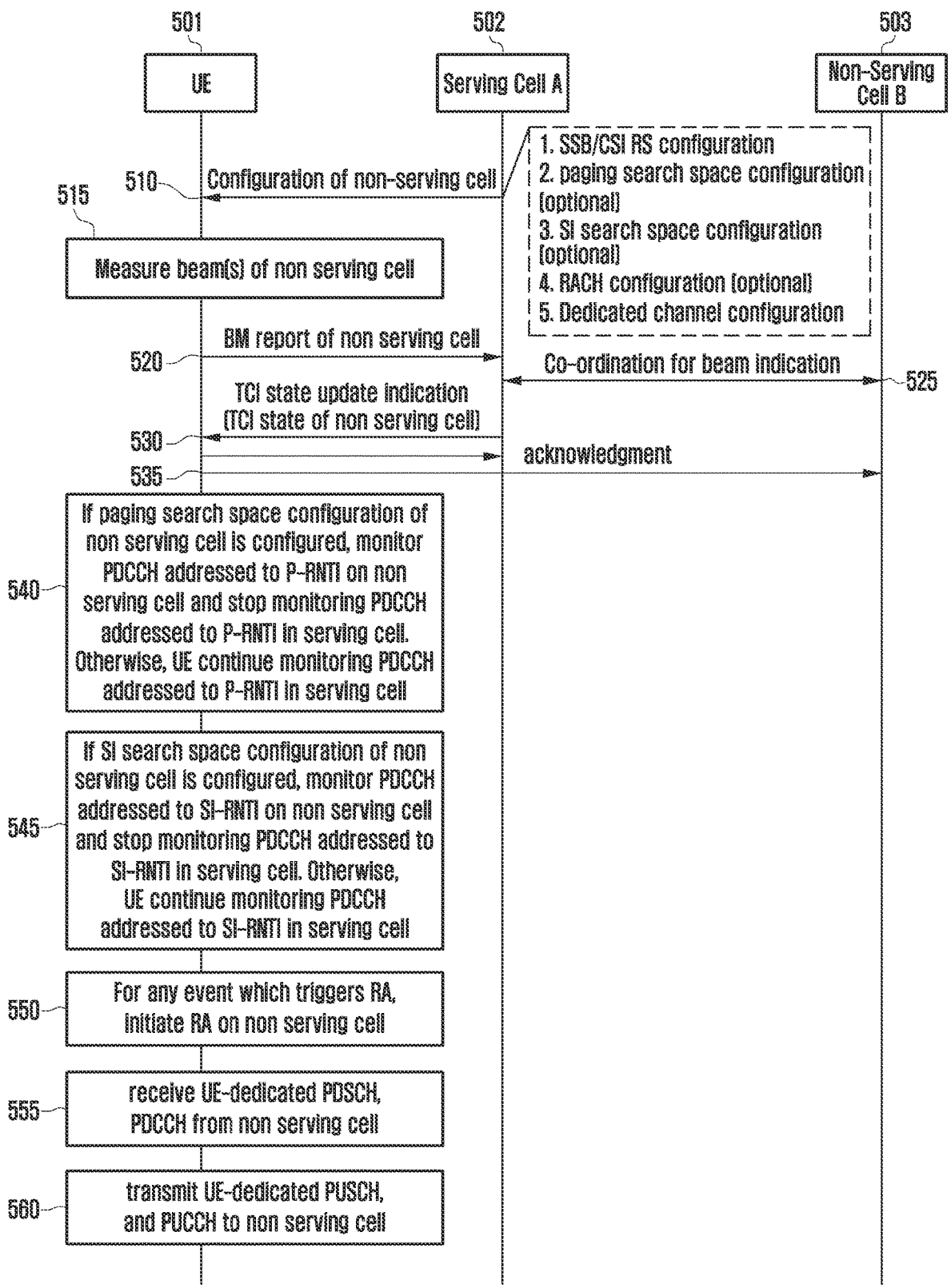
FIG. 5 illustrates another example of a signaling flow between a UE and a network upon beam change from serving cell to non-serving cell according to an embodiment of the disclosure.

FIG. 5 illustrates an example of a signaling flow between UE and network upon beam change from serving cell to non-serving cell, according to an embodiment of the disclosure. Here 'Serving Cell' may also be referred as a TRP of serving cell with same PCI as serving cell. 'Non-serving cell' may be referred as a TRP of serving cell with different PCI other than PCI of serving cell. Non-serving cell may also be referred as auxiliary cell.

1. UE (501) receives, from a serving cell (502) (e.g., PCell), a configuration (510) of a non-serving cell (503). The configuration of the non-serving cell may be received for multiple non-serving cells. The non-serving cell (503) is a neighbor cell which is not one of the serving cells within the configured cell group(s). The non-serving cell is associated with one of serving cells. In an embodiment, associated serving cell of non-serving cell may always be the SpCell. In an embodiment, associated serving cell of non-serving cell may be SCell or SpCell. This association between the serving cell and the non-serving cell may be signaled in the configuration. The association may be implicitly indicated by including non-serving configuration in serving cell configuration of associated serving cell. RRCReconfiguration message may be used for configuration. For example, RRCReconfiguration message includes the configuration of non-serving cell.

Configuration of non-serving cell includes beam measurement configuration such as SSBs/CSI-RSs to measure, time and frequency resources of SSBs/CSI-RSs, quantity to measure and report, number of SSBs/CSI-RSs to report, QCL information of SSBs/CSI-RSs with respect to SSBs/CSI-RSs in serving cell (e.g., signaling may indicate which SSB/CSI-RS of non-serving cell is QCLed with which SSB/CSI-RS of serving cell and which serving cell), threshold for reporting a SSB/CSI-RS in report, reporting type (e.g., periodic, period of reporting if periodic) etc.

Configuration of non-serving cell may include paging search space configuration (e.g., search space and corset to measure) for monitoring PDCCH for paging in non-serving cell.

Configuration may include system information search space configuration (e.g., search space and corset to measure, searchSpaceSIB1, searchSpaceOtherSystemInformation) for monitoring PDCCH for system information in non-serving cell.

Configuration of non-serving cell may include RACH configuration (e.g., RAR search space and CORESET to measure, RACH resources (preambles config, RACH occasion config, etc.) and parameters) for performing RA in non-serving cell. Configuration of non-serving cell may include configuration of one or more BWPs of non-serving cell. Configuration of non-serving cell may indicate which BWP of non-serving cell should be activated upon reception of TCI state update indication activating TCI state of non-serving cell; if not indicated the BWP with BWP id of active BWP on serving cell is activated on non-serving cell. Configuration of non-serving cell may include C-RNTI, CS-RNTI to be used in non-serving cell; if not included UE continue to use C-RNTI, CS-RNTI of serving cell in non-serving cell upon activation of TCI state of non-serving cell. Configuration of non-serving cell may indicate whether to perform RACH or not upon activation of TCI state of non-serving cell.

2. UE performs measurement of SSBs/CSI-RSs of non-serving cell as per the received configuration (515) and report information on the measurement result to serving cell (520). Serving cell coordinates with non-serving cell (525) and determines whether to activate TCI state of non-serving cell or not. Serving cell may indicate one or more TCI states of non-serving cell which can be activated based on report from UE or alternately serving cell may send the report to non-serving cell and non-serving cell indicates the TCI state to be activated to serving cell. In an alternate embodiment, determination of TCI state of non-serving cell to be activated may be taken by serving cell itself based on report from UE.

3. Serving cell indicates to UE the TCI state of non-serving cell to be activated (530). The indication may be via PDCCH or MAC CE. MAC CE may include one or more of TCI state ID, corset ID, cell identification (e.g., cell ID).

4. Upon receiving, from serving cell, information on TCI state update (beam indication) indicating/activating beam/ TCI state of non-serving cell, UE may send an acknowledgment (535). The acknowledgment may be sent to serving cell. Alternately, the acknowledgment may be sent to non-serving cell. The acknowledgment may be L1 signal such as PUCCH or MAC CE or PRACH.

5. Upon activation of TCI state of non-serving cell, UE activates the UL BWP and DL BWP of non-serving cell. Configuration of non-serving cell may indicate which BWP of non-serving cell should be activated upon reception of information on TCI state update indication activating TCI state of non-serving cell; if not indicated the BWP with BWP id of active BWP on serving cell is activated on non-serving cell; or alternately, information on TCI state update indication may indicate the BWP to be activated (information may include BWP ID of DL BWP to be activated, BWP ID of UL BWP to be activated; information may be include BWP ID of BWP to be activated, BWP ID is same for both DL BWP and UL BWP).

6. Upon activation of TCI state of non-serving cell, UE starts receiving UE-dedicated PDSCH, PDCCH from non-serving cell (555). UE starts transmitting UE-dedicated PUSCH, and PUCCH to non-serving cell (560). UE stops receiving UE-dedicated PDSCH, PDCCH from serving cell associated with non-serving cell. UE stops transmitting UE-dedicated PUSCH, and PUCCH to serving cell associated with non-serving cell. In an embodiment, associated serving cell may always be the SpCell. In an embodiment, associated serving cell may be SCell or SpCell.

7. Upon activation of TCI state of non-serving cell, if paging search space configuration of the non-serving cell is configured UE stops monitoring PDCCH addressed to P-RNTI (i.e., SI update/emergency notifications) in serving cell (associated with the non-serving cell). UE monitors PDCCH addressed to P-RNTI on the non-serving cell according to received paging search space configuration of the non-serving cell if paging search space configuration of the non-serving cell is configured (540). If paging search space configuration of the non-serving cell is not configured, UE does not monitor PDCCH addressed to P-RNTI on the non-serving cell and monitors PDCCH addressed to P-RNTI on the serving cell; emergency SIB(s) in case of emergency notifications are signaled and other updated SIBs are sent to UE using dedicated RRC message e.g., in case if UE cannot monitor PDCCH addressed to P-RNTI on the serving cell while it is monitoring/receiving dedicated channels from non-serving cell.

8. Upon activation of TCI state of non-serving cell, if SI search space configuration of the non-serving cell is configured (i.e., received from serving cell in para 1), UE stops monitoring PDCCH addressed to SI-RNTI in serving cell (associated with the non-serving cell); UE acquires the required SIB(s) from the non-serving cell; UE monitors PDCCH addressed to SI-RNTI in non-serving cell according to received SI search space configuration of the non-serving cell (545). If SI search space configuration of the non-serving cell is not configured, UE does not monitor PDCCH addressed to SI-RNTI on the non-serving cell and monitors PDCCH addressed to SI-RNTI in serving cell; required SIB(s) in case of SI update are received from serving cell. SI search space configuration is searchSpaceSIB1 and searchSpaceOtherSystemInformation.

9. Upon activation of TCI state of non-serving cell, if RACH configuration of non-serving cell is configured (i.e., received from serving cell as in para 1), RACH (when triggered) is performed on the non-serving cell (550). If RACH configuration of non-serving cell is not configured, RACH (when triggered) is performed on the serving cell.

In an embodiment, operation in para 7 and para 8 above is performed only if non-serving cell is associated with PCell.

In these embodiments of method 1, network can ensure that PDCCH monitoring occasions in serving cell are not overlapped with non-serving cell. Otherwise, in case of overlapping, in an embodiment, UE prioritize monitoring in non-serving cell. In another embodiment, UE prioritize monitoring in serving cell. In another embodiment, UE prioritize monitoring in serving cell if monitoring is for paging, otherwise, UE prioritize monitoring in non-serving cell. In an embodiment, whether to prioritize monitoring in serving cell or non-serving cell may be signaled (e.g., in RRC message) by gNB.

According to an embodiment of the disclosure, the UE can receive paging and/or system information and perform random access procedures, upon receiving TCI state update that indicates a beam for non-serving cell.

Method 2: Handling CG Type 2 Resources 4G and 5G wireless communication system supports vehicular communication services. Vehicular communication services, represented by vehicle to everything (V2X) services, may consist of the following four different types: vehicle to vehicle (V2V), vehicle to infrastructure (V2I), vehicle to network (V2N) and vehicle to pedestrian (V2P). In fifth generation (also referred as NR or New Radio) wireless communication system, V2X communication is being enhanced to support enhanced V2X use cases, which are broadly arranged into four use case groups: 1) Vehicles Platooning enables the vehicles to dynamically form a platoon travelling together. All the vehicles in the platoon obtain information from the leading vehicle to manage this platoon. This information allows the vehicles to drive closer than normal in a coordinated manner, going to the same direction and travelling together. 2) Extended Sensors enable the exchange of raw or processed data gathered through local sensors or live video images among vehicles, road site units, devices of pedestrian and V2X application servers. The vehicles can increase the perception of their environment beyond of what their own sensors can detect and have a broader and holistic view of the local situation. High data rate is one of the key characteristics. 3) Advanced Driving enables semi-automated or full-automated driving. Each vehicle and/or roadside unit (RSU) shares its own perception data obtained from its local sensors with vehicles in proximity and that allows vehicles to synchronize and coordinate their trajectories or maneuvers. Each vehicle shares its driving intention with vehicles in proximity too. 4) Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

For sidelink (SL) communication, two sidelink resource allocation modes are supported: mode 1 and mode 2. In mode 1, the sidelink resource allocation is provided by the network. In mode 2, UE decides the SL transmission resources in the resource pool(s). NG-RAN may dynamically allocate resources to the UE via the sidelink-radio network temporary identifier (SL-RNTI) on PDCCH(s) for NR sidelink communication. In addition, NG-RAN may allocate sidelink resources to a UE with two types of configured sidelink grants:

With type 1 (i.e., configured grant (CG) Type 1), RRC directly provides the configured sidelink grant only for NR sidelink communication; If CG Type 1 is configured, UE uses CG Type 1 while T310 timer is running and CG Type 1 is released when T311 timer is started.

With type 2 (i.e., CG Type 2), RRC defines the periodicity of the configured sidelink grant while PDCCH may either signal and activate the configured sidelink grant, or deactivate it. The PDCCH is addressed to a sidelink-configured scheduling-radio network temporary identifier (SL-CS-RNTI) for NR sidelink communication.

How to handle CG type 2 resources upon detection of physical layer problem on link between UE and gNB needs further discussion.

Figure 6:
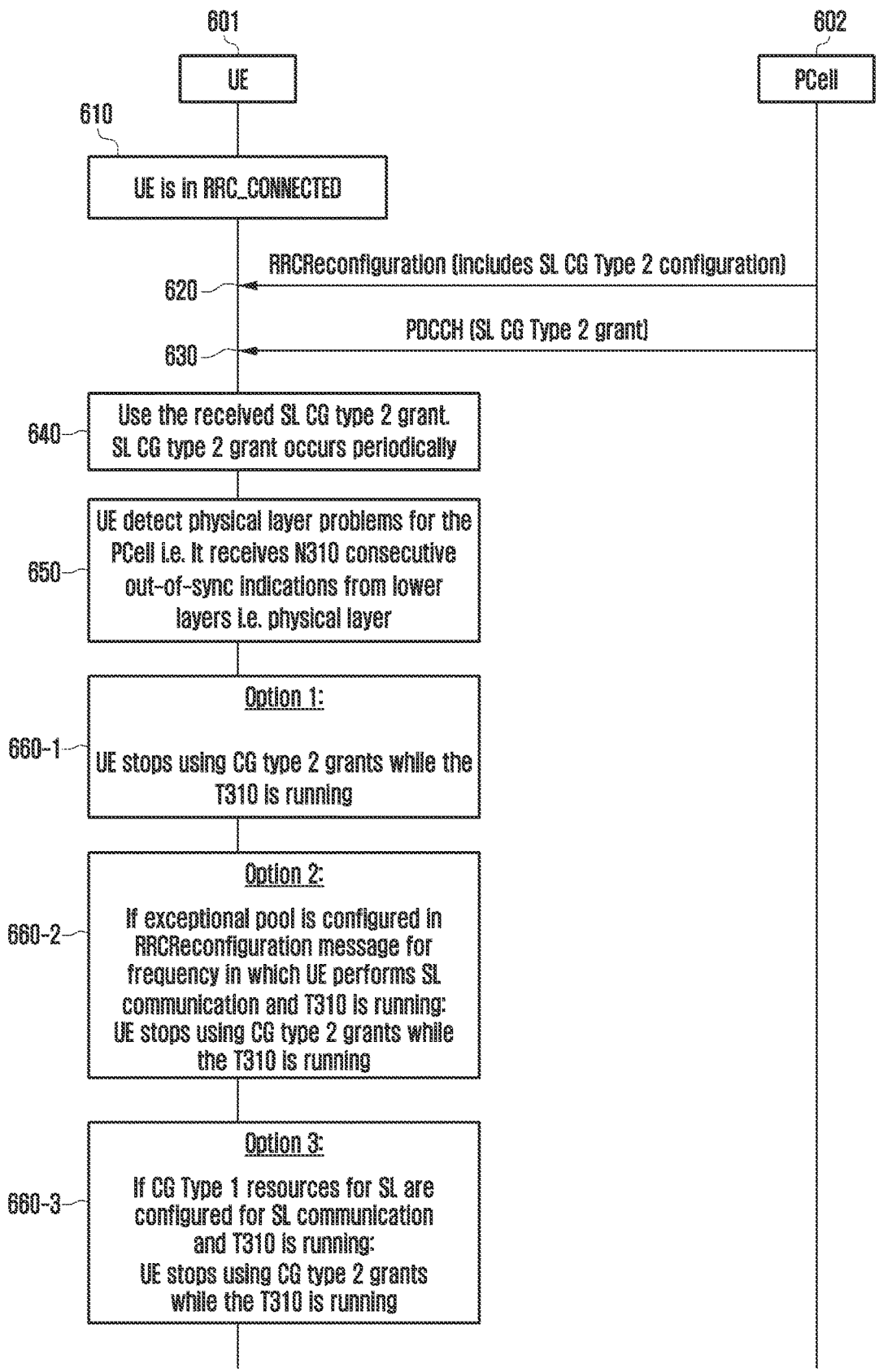
FIG. 6 illustrates a method of handling CG type 2 resources by a UE in radio resource control (RRC) connected state, according to an embodiment of the disclosure.

FIG. 6 illustrates a method of handling CG type 2 resources by a UE in RRC connected state, according to an embodiment of the disclosure.

1. UE (601) is in RRC_CONNECTED state (610). UE has sent sidelink UE information message to request resources for SL communication.

2. UE receives RRCReconfiguration from network (602) (e.g., PCell) (620). RRCReconfiguration message may include CG type 2 configuration for SL communication. The following parameters may be configured:
   sl-ConfigIndexCG: the identifier of a configured grant for sidelink;
   sl-CS-RNTI: SLCS-RNTI for activation, deactivation, and retransmission;
   sl-NrOfHARQ-Processes: the number of HARQ processes for configured grant;
   sl-PeriodCG: periodicity of the configured grant Type 2;
   sl-CG-MaxTransNumList: the maximum number of times that a TB can be transmitted using the configured grant; and/or
   sl-HARQ-ProcID-offset: offset of HARQ process for configured grant Type 2.

3. UE receives PDCCH addressed to sl-CS-RNTI (630). PDCCH provides the SL grant (e.g., SL CG type 2) which the UE uses periodically (640).

4. In the RRC CONNECTED state, UE performs radio link monitoring (RLM). UE is configured with RLM-RS resource(s). On each RLM-RS resource, the UE estimates the downlink radio link quality and compare it to the thresholds Qout and Qin. Qout represents a level at which the downlink radio link cannot be reliably received and corresponds to the out-of-sync block error rate (BLERout). Qin represents a level at which the downlink radio link quality can be received with higher reliability and correspond to the in-sync block error rate (BLERin). BLERout and BLERin are signaled. Out of sync indication is generated when downlink radio link quality on all the configured RLM-RS resources is worse than Qout. In sync indication is generated when downlink radio link quality on at least one of the configured RLM-RS resources is better than Qin. RRC layer in UE performs RLM based on these indications. UE may detect physical layer problems with the network (e.g., PCell) based on the RLM. Upon receiving N310 consecutive "out-of-sync" indications for the PCell from lower layers (650) while neither T300, T301, T304, T311, T316 nor T319 are running, UE start timer T310 for the corresponding PCell. Upon receiving N311 consecutive "in-sync" indications for the PCell from lower layers while T310 is running, the UE shall stop timer T310 for the corresponding PCell. If T310 expires, radio link failure (RLF) is declared.

5. In an embodiment of the disclosure, UE stops using SL CG type 2 grants while the T310 is running (660-1). If T310 expires, SL CG type 2 grants are released. If T310 is stopped (due N311 consecutive "in-sync" indications), UE starts using SL CG type 2 grants.

In an alternate embodiment of this disclosure, if exceptional transmission pool of resources is configured in RRCReconfiguration message for frequency in which UE performs SL communication and T310 is running, UE stops using CG type 2 grants while the T310 is running (660-2). If T310 expires, SL CG type 2 grants are released. If T310 is stopped (due N311 consecutive "in-sync" indications), UE starts using SL CG type 2 grants.

In an alternate embodiment of this disclosure, if CG Type 1 resources for SL are configured for SL communication and T310 is running: UE stops using CG type 2 grants while the T310 is running (660-3). If T310 expires, SL CG type 2 grants are released. If T310 is stopped (due N311 consecutive "in-sync" indications), UE starts using SL CG type 2 grants.

In an embodiment, the above operation as in para 4/5 may also be applied for PSCell.

According to an embodiment of the disclosure, UE can handle CG type 2 resources upon detection of physical layer problem on link between UE and base station.

Method 3: Preambles for Small Data Transmission (SDT)

For small data transmission, random access procedure is initiated. Upon receiving the random access preamble, gNB should be able to distinguish whether the UE has initiated the random access for small data transmission or not.

In the LTE system, preambles for small data transmission is configured per coverage extension (CE) levels. There may be one or more CE levels. The preambles for normal random access (i.e., other than small data transmission) are signaling by eNB using two parameters: firstPreamble and lastPreamble. These parameters are signaled for each CE level. Each of firstPreamble and lastPreamble indicates a preamble index. For a given CE level, the preambles from firstPreamble to lastPreamble are used for normal random access. The preambles for random access for small data transmission are indicated by eNB by signaling additional parameter: edt-lastPreamble. For the concerned CE level, if PRACH resources configured for small data transmission are different from the PRACH resources configured for non-small data transmission for all CE levels and for small data transmission for all other CE levels, the preambles for small data transmission are the preambles firstPreamble to edt-lastPreamble. Otherwise, the preambles for small data transmission are the preambles lastPreamble+1 to edt-LastPreamble.

In the NR system, the preambles for random access are indicated by gNB by signaling parameters: ssb-perRACH-Occasion and CB-PreamblesPerSSB in RACH configuration. In an UL BWP, 4-step random access (4SRA) for SDT and/or 4SRA for Non SDT and/or 2-step random access (2SRA) for SDT and/or 2SRA for non SDT can be configured. Random occasions (ROs) may or may not be shared between one or more of these RA types i.e., 4SRA for SDT, 4SRA for Non SDT, 2S RA for SDT, 2SRA for non SDT. The issue is how to determine which preambles/SSB/RO are used for 4S RA SDT and 2S RA SDT. Explicitly indicating each preamble index for each SSB/RO will lead to significant signaling overhead.

Embodiment 1

4 step RACH is configured in the UL BWP and small data transmission is supported using 4 step RACH in the UL BWP. Small data transmission is considered supported using 4 step RACH in the UL BWP, if that UL BWP configuration includes 4 step RACH configuration for small data transmission. UL BWP configuration may be received from gNB in system information or RRC reconfiguration message. Note that here UL BWP refers to BWP on which UE transmits PRACH for small data transmission. This UL BWP may be initial UL BWP or another UL BWP indicated by gNB for small data transmission. 2 step RACH is not configured in this UL BWP (i.e., neither configured for small data transmission, nor for regular 2 step random access). In the below description the parameters correspond to the UL BWP for small data transmission.

For 4 step RACH, if ROs configured for small data transmission are shared with ROs configured for regular 4 step random access (i.e., non-small data transmission):
  UE determines the starting preamble index for small data transmission as follows:
    Starting preamble index (S)=totalNumberOfRA-Preambles is the total number of RA preambles configured for regular random access.
    N1 is number of SSBs per RACH occasion configured (e.g., in the rach-ConfigCommon IE) for regular 4 step random access.
  UE determines preambles for each SSB as follows:
    If N1<1: Preambles starting from S to S+CB-PreamblesPerSSB-SDT (X)−1 are used for small data transmission. In other words, X contention based preambles with consecutive indexes associated with the SSB per valid PRACH occasion start from S.
    If N1>=1, X contention based preambles with consecutive indexes associated with SS/PBCH block n, 0≤n≤N1−1, per valid PRACH occasion start from preamble index 'S+n·$N_{preamble}^{total}$/N1', where $N_{preamble}^{total}$ is provided by T. T is the total number of RA preambles configured for SDT random access.

During the random access procedure initiated for small data transmission, for each random access attempt, UE first selects SSB (e.g., SSB with highest SS-RSRP or SSB with SS-RSRP above a configured threshold or any SSB if there is no SSB with SS-RSRP above threshold) and then preamble and RO corresponding to selected SSB wherein preamble is selected from set of preambles corresponding to the selected SSB as determined above. Mapping between ROs and SSBs is determined as in regular random access procedure. UE then transmits selected PRACH preamble and selected RO.

Embodiment 2

2 step RACH is configured in the UL BWP and small data transmission is supported using 2 step RACH in the UL BWP. Small data transmission is considered supported using 2 step RACH in the UL BWP, if that UL BWP configuration includes 2 step RACH configuration for small data transmission. UL BWP configuration may be received from gNB in system information or RRC reconfiguration message. Note that here UL BWP refers to BWP on which UE transmits PRACH for small data transmission. This UL BWP may be initial UL BWP or another UL BWP indicated by gNB for small data transmission. 4 step RACH is not configured in this UL BWP (i.e., neither configured for small data transmission, nor for regular 4 step random access). In the below description the parameters correspond to the UL BWP for small data transmission.

For 2 step RACH, if ROs configured for small data transmission are shared with ROs configured for regular 2 step random access (i.e., non-small data transmission):
  UE determines the starting preamble index for small data transmission as follows:
    Starting preamble index (S)=totalNumberOfRA-Preambles. totalNumberOfRA-Preambles is the total number of RA preambles configured for regular 2 step random access. N1 is ssb-perRACH-Occasion
    CB-PreamblesPerSSB-SDT (X) is configured/signaled (e.g., in the rach-ConfigCommon2Step-SDT IE) by gNB for small data transmission using 2 step RACH.
  UE determines preambles for each SSB as follows:
    If N1<1: Preambles starting from S to S+CB-PreamblesPerSSB-SDT (X)−1 are used for small data transmission. In other words, X contention based preambles with consecutive indexes associated with the SSB per valid PRACH occasion start from S.
    If N1>=1, X contention based preambles with consecutive indexes associated with SS/PBCH block n, 0≤n≤N1−1, per valid PRACH occasion start from preamble index 'S+n·$N_{preamble}^{total}$/N1', where $N_{preamble}^{total}$ is provided by T. T is the total number of RA preambles configured for SDT random access.

During the random access procedure initiated for small data transmission, for each random access attempt UE first select SSB (SSB with highest SS-RSRP or SSB with SS-RSRP above a configured threshold or any SSB if there is no SSB with SS-RSRP above threshold) and then preamble and RO corresponding to selected SSB wherein preamble is selected from set of preambles determined above corresponding to the selected SSB. Mapping between ROs and SSBs is determined as in regular random access procedure. UE then transmit selected PRACH preamble and selected RO. UE shall also select PUSCH occasion from PUSCH occasions configured for small data transmission and transmit MsgA MAC PDU which include small data i.e., MAC SDU(s) for DRB.

Embodiment 3

Both 2 step RACH and 4 step RACH are configured in the UL BWP. ROs are shared between 2 step RACH and 4 step RACH. Small data transmission is supported in the UL BWP. This UL BWP may be initial UL BWP or another UL BWP indicated by gNB for small data transmission.

Case 1: Small data transmission is supported in the UL BWP using 4 step RACH and not supported for 2 step RACH.

For 4 step RACH, if ROs configured for small data transmission are shared with ROs configured for regular random access (i.e., non-small data transmission): UE determines preambles as in embodiment 1 except that the totalNumberOfRA-Preambles is the total number of preambles for regular random access (2 step RACH as well as 4 step RACH)

Case 2: Small data transmission is supported in the UL BWP using 2 step RACH and not supported for 4 step RACH.

For 2 step RACH, if ROs configured for small data transmission are shared with ROs configured for regular 2 step random access (i.e., non-small data transmission): UE determines preambles as in embodiment 2 except that the totalNumberOfRA-Preambles is the total number of preambles for regular random access (2 step RACH as well as 4 step RACH).

Case 3: Small data transmission is supported in the UL BWP using both 2 step RACH and 4 step RACH.

If ROs configured for small data transmission are shared with ROs configured for regular random access (i.e., non small data transmission):

For small data transmission using 4 step RACH:
UE determines preambles as in embodiment 1 except that the totalNumberOfRA-Preambles is the total number of preambles for regular random access (2 step RACH as well as 4 step RACH)

For small data transmission using 2 step RACH:
UE determines the starting preamble index for small data transmission as follows:

Starting preamble index (S)=totalNumberOfRA-Preambles+R3, R3 is CB-PreamblesPerSSB configured (e.g., in the rach-ConfigCommon2Step IE) for small data transmission using 4 step RACH. totalNumberOfRA-Preambles is the total number of preambles for regular random access (2 step as well as 4 step). In an embodiment, R3 may be an index signaled by gNB in 2 step RA SDT configuration.

CB-PreamblesPerSSB2Step-SDT (X) is configured/signaled (e.g., in the rach-ConfigCommon2Step-SDT IE) by gNB for small data transmission using 2 step RACH.

UE determines preambles for each SSB as follows:
If N1<1: Preambles starting from S to S+CB-PreamblesPerSSB2Step-SDT (X)−1 are used for small data transmission. In other words, X contention based preambles with consecutive indexes associated with the SSB per valid PRACH occasion start from S.

If N1>=1, X contention based preambles with consecutive indexes associated with SS/PBCH block n, 0≤n≤N1−1, per valid PRACH occasion start from preamble index 'S+n·$N_{preamble}^{total}$/N1', where $N_{preamble}^{total}$ is provided by T. T is the total number of RA preambles configured for SDT random access.

In an embodiment, instead of parameter totalNumberOfRA-Preambles, in embodiment(s) 1/2/3, an index may be used which is signaled by gNB in SDT configuration signaled by gNB.

According to an embodiment of the disclosure, preambles for small data transmission can be configured.

Figure 7:
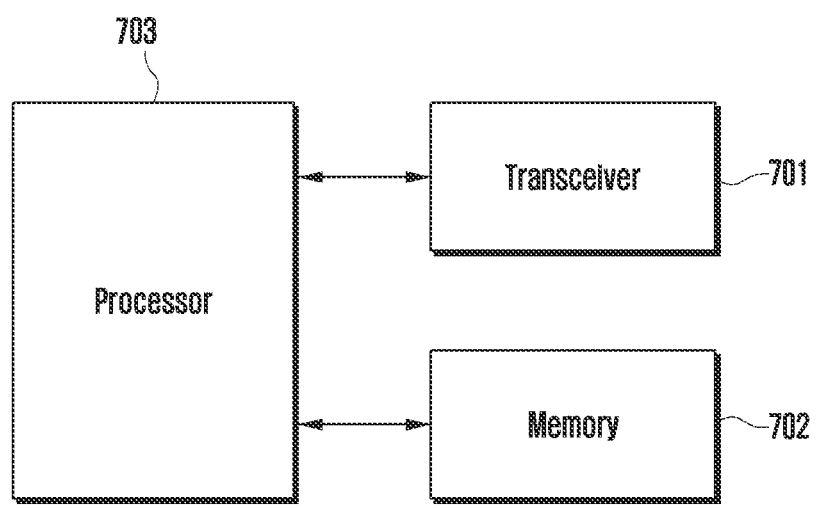
FIG. 7 illustrates a structure of a UE according to an embodiment of the disclosure.

FIG. 7 illustrates a structure of a UE according to an embodiment of the disclosure.

Referring to FIG. 7, the UE may include a transceiver 701, a memory 702, and a processor 703. However, the components of the UE are not limited to the above-described examples. For example, the UE may include more or fewer components than the aforementioned components. Further, the transceiver 701, the memory 702, and the processor 703 may be implemented in the form of a single chip.

According to an embodiment of the disclosure, the transceiver 701 may transmit and receive a signal to and from the base station. The above-described signal may include control information and data. To this end, the transceiver 701 may include an RF transmitter for up-converting and amplifying a frequency of a signal to be transmitted, and an RF receiver for low-noise amplifying a received signal and down-converting a frequency of thereof. Further, the transceiver 701 may receive a signal through a wireless channel and output the signal to the processor 703, and transmit the signal output from the processor 703 through a wireless channel.

The processor 703 may be configured to control operations of the UE according to embodiments of the above-described methods (e.g., Methods 1, 2, 3).

According to an embodiment of the disclosure, the memory 702 may store programs and data necessary for an operation of the UE. Further, the memory 702 may store control information or data included in a signal transmitted and received by the UE. The memory 702 may be configured with a storage medium or a combination of storage media, such as a ROM, RAM, hard disk, CD-ROM, and DVD. Further, the memory 702 may be configured with a plurality of memories. According to an embodiment of the disclosure, the memory 702 may store a program for controlling and receiving an operation for reducing power consumption of the UE.

Figure 8:
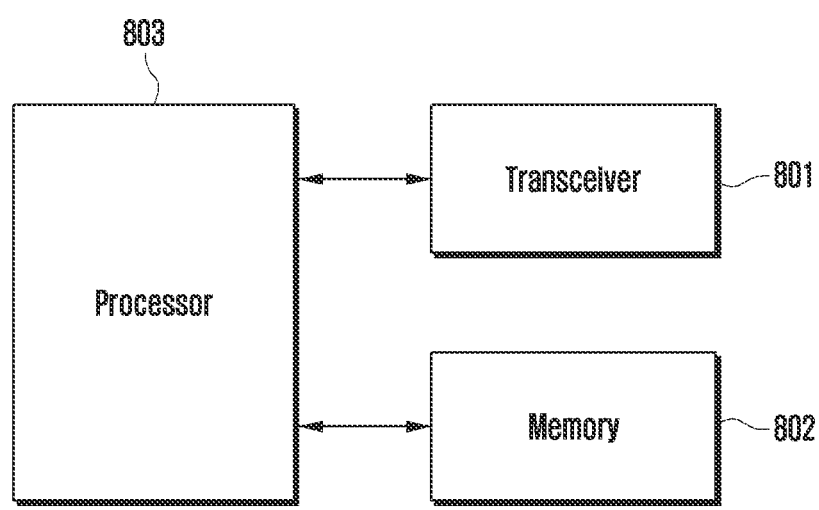
FIG. 8 illustrates a structure of a base station according to an embodiment of the disclosure.

FIG. 8 illustrates a structure of a base station according to an embodiment of the disclosure.

Referring to FIG. 8, the base station may include a transceiver 801, a memory 802, and a processor 803. However, the components of the base station are not limited to the above-described example. For example, the UE may include more or fewer components than the aforementioned components. Further, the transceiver 801, the memory 802, and the processor 803 may be implemented in the form of a single chip.

According to an embodiment of the disclosure, the transceiver 801 may transmit and receive a signal to and from the UE. The above-described signal may include control information and data. To this end, the transceiver 801 may include an RF transmitter for up-converting and amplifying a frequency of a signal to be transmitted, and an RF receiver for low-noise amplifying a received signal and down-converting a frequency of thereof. Further, the transceiver 801 may receive a signal through a wireless channel, output the signal to the processor 803, and transmit the signal output from the processor 803 through a wireless channel.

The processor 803 may be configured to control operations of the base station according to embodiments of the above-described methods (e.g., Methods 1, 2, 3).

According to an embodiment of the disclosure, the memory 802 may store programs and data necessary for an operation of the base station. Further, the memory 802 may store control information or data included in a signal transmitted and received by the base station. The memory 802 may be configured with a storage medium or a combination of storage media, such as a ROM, RAM, hard disk, CD-ROM, and DVD. Further, the memory 802 may be configured with a plurality of memories. According to an embodiment of the disclosure, the memory 802 may store a program of the base station for generating and transmitting control information for reducing power consumption of the UE.

Methods according to the embodiments described in the claims or specifications of the disclosure may be implemented in the form of hardware, software, or a combination of hardware and software.

When implemented in software, a computer readable storage medium or computer program product storing one or more programs (software modules) may be provided. One or more programs stored in the computer readable storage medium or computer program product are configured for execution by one or more processors in an electronic device. The one or more programs include instructions for causing an electronic device to execute methods according to embodiments described in a claim or specification of the disclosure.

Such programs (software modules, software) may be stored in a random access memory, a non-volatile memory including a flash memory, a read only memory (ROM), an electrically erasable programmable ROM (EEPROM), a magnetic disc storage device, a compact disc-ROM (CD- ROM), digital versatile discs (DVDs), any other form of optical storage device, or a magnetic cassette. Alternatively, the programs may be stored in a memory configured with a combination of some or all thereof. Further, each configuration memory may be included in the plural.

Further, the program may be stored in an attachable storage device that may access through a communication network such as the Internet, Intranet, local area network (LAN), wide LAN (WLAN), or storage area Network (SAN), or a communication network configured with a combination thereof. Such a storage device may access to a device implementing an embodiment of the disclosure through an external port. Further, a separate storage device on the communication network may access to the device implementing the embodiment of the disclosure.

In the specific embodiments of the disclosure described above, elements included in the disclosure are represented in the singular or plural according to the presented specific embodiments. However, the singular or plural expression is appropriately selected for a situation presented for convenience of description, and the disclosure is not limited to the singular or plural element, and even if a component is represented in the plural, it may be configured with the singular, or even if a component is represented in the singular, it may be configured with the plural.

Each of the above embodiments may be operated in combination with each other, as needed. For example, the base station and the UE may be operated by combining parts of an embodiment and another embodiment of the disclosure with each other. Further, the embodiments of the disclosure are applicable to other communication systems, and other modifications based on the technical spirit of the embodiments may also be implemented. For example, embodiments may be applied to LTE systems, 5G or NR systems, and the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
   receiving radio resource control (RRC) information associated with a sidelink configured grant type 1;
   receiving a physical downlink control channel (PDCCH) associated with a sidelink configured grant type 2;
   identifying whether a number of consecutive out-of-sync indications are received from lower layers; and
   starting a timer in case that the number of consecutive out-of-sync indications are received,
   wherein, while the timer is running, the UE uses resources of the sidelink configured grant type 1 without using resources of the sidelink configured grant type 2.

2. The method of claim 1, further comprising:
   receiving an RRC reconfiguration message including at least one of an identifier to identify the sidelink configured grant type 2, a number of hybrid automatic repeat request (HARQ) processes for the sidelink configured grant type 2, a periodicity of the sidelink configured grant type 2, a maximum number of times that a transport block (TB) can be transmitted using resources of the sidelink configured grant type 2, or an offset associated with a HARQ process for the sidelink configured grant Type 2.

3. The method of claim 1, wherein the PDCCH is addressed to a sidelink-configured scheduling-radio network temporary identifier (SL-CS-RNTI).

4. The method of claim 1, further comprising:
   receiving a number of consecutive in-sync indications from lower layers while the timer is running; and
   stopping the timer upon the receiving of the number of consecutive in-sync indications,
   wherein in case that the timer stops, the UE starts using the resources of the sidelink configured grant type 2.

5. A user equipment (UE) in a wireless communication system, the UE comprising:
   a transceiver; and
   a processor operably connected with the transceiver and configured to:
      receive, via the transceiver, radio resource control (RRC) information associated with a sidelink configured grant type 1,
      receive, via the transceiver, a physical downlink control channel (PDCCH) associated with a sidelink configured grant type 2,
      identify whether a number of consecutive out-of-sync indications are received from lower layers, and
      start a timer in case that the number of consecutive out-of-sync indications are received,
   wherein, while the timer is running, the UE uses resources of the sidelink configured grant type 1 without using resources of the sidelink configured grant type 2.

6. The UE of claim 5, wherein the processor is further configured to:
   receive, via the transceiver, an RRC reconfiguration message including at least one of an identifier to identify the sidelink configured grant type 2, a number of hybrid automatic repeat request (HARQ) processes for the sidelink configured grant type 2, a periodicity of the sidelink configured grant type 2, a maximum number of times that a transport block (TB) can be transmitted using resources of the sidelink configured grant type 2, or an offset associated with a HARQ process for the sidelink configured grant Type 2.

7. The UE of claim 5, wherein the PDCCH is addressed to a sidelink-configured scheduling-radio network temporary identifier (SL-CS-RNTI).

8. The UE of claim 5, wherein the processor is further configured to:
   receive a number of consecutive in-sync indications from lower layers while the timer is running; and
   stop the timer upon the reception of the number of consecutive in-sync indications,
   wherein in case that the timer stops, the UE starts using the resources of the sidelink configured grant type 2.

9. A method performed by a base station in a wireless communication system, the method comprising:
   transmitting, to a user equipment (UE), radio resource control (RRC) information associated with a sidelink configured grant type 1; and
   transmitting, to the UE, a physical downlink control channel (PDCCH) associated with a sidelink configured grant type 2,
   wherein in case that a number of consecutive out-of-sync indications are received by the UE from lower layers, a timer starts, and
   wherein, while the timer is running, resources of the sidelink configured grant type 1 are used and resources of the sidelink configured grant type 2 are not used by the UE.

10. The method of claim 9, further comprising:
transmitting, to the UE, an RRC reconfiguration message including at least one of an identifier to identify the sidelink configured grant type 2, a number of hybrid automatic repeat request (HARQ) processes for the sidelink configured grant type 2, a periodicity of the sidelink configured grant type 2, a maximum number of times that a transport block (TB) can be transmitted using resources of the sidelink configured grant type 2, or an offset associated with a HARQ process for the sidelink configured grant Type 2.

11. The method of claim 9, wherein the PDCCH is addressed to a sidelink-configured scheduling-radio network temporary identifier (SL-CS-RNTI).

12. The method of claim 9,
wherein the timer stops, in case that a number of consecutive in-sync indications are received by the UE from lower layers while the timer is running, and
wherein in case that the timer stops, the resources of the sidelink configured grant type 2 are used by the UE.

13. A base station in a wireless communication system, the base station comprising:
a transceiver; and
a processor operably connected with the transceiver and configured to:
transmit, to a user equipment (UE), radio resource control (RRC) information associated with a sidelink configured grant type 1, and
transmit, to the UE via the transceiver, a physical downlink control channel (PDCCH) associated with a sidelink configured grant type 2,
wherein in case that a number of consecutive out-of-sync indications are received by the UE from lower layers, a timer starts, and
wherein, while the timer is running, resources of the sidelink configured grant type 1 are used and resources of the sidelink configured grant type 2 are not used by the UE.

14. The base station of claim 13, wherein the PDCCH is addressed to a sidelink-configured scheduling-radio network temporary identifier (SL-CS-RNTI).

15. The base station of claim 13, wherein the transceiver is further configured to:
transmit, to the UE, an RRC reconfiguration message including at least one of an identifier to identify the sidelink configured grant type 2, a number of hybrid automatic repeat request (HARQ) processes for the sidelink configured grant type 2, a periodicity of the sidelink configured grant type 2, a maximum number of times that a transport block (TB) can be transmitted using resources of the sidelink configured grant type 2, or an offset associated with a HARQ process for the sidelink configured grant Type 2.

* * * * *